United States Patent
Goteti et al.

(10) Patent No.: US 12,397,994 B2
(45) Date of Patent: Aug. 26, 2025

(54) METHOD TO ENHANCE SUBSURFACE GAS STORAGE IN SALT CAVERNS

(71) Applicant: ARAMCO SERVICES COMPANY, Houston, TX (US)

(72) Inventors: Rajesh Goteti, Katy, TX (US); Hasmukh A. Patel, Houston, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 194 days.

(21) Appl. No.: 18/185,667

(22) Filed: Mar. 17, 2023

(65) Prior Publication Data

US 2023/0294920 A1     Sep. 21, 2023

Related U.S. Application Data

(60) Provisional application No. 63/269,508, filed on Mar. 17, 2022.

(51) Int. Cl.
*B65G 5/00*  (2006.01)
*E21B 33/03*  (2006.01)
(Continued)

(52) U.S. Cl.
CPC ............... *B65G 5/00* (2013.01); *E21B 33/03* (2013.01); *E21B 41/0064* (2013.01);
(Continued)

(58) Field of Classification Search
CPC ...... E21B 41/0064; E21B 43/28; E21B 33/03; E21B 41/0057; B65G 5/00; F17C 11/007;
(Continued)

(56) References Cited

U.S. PATENT DOCUMENTS 3,574,402 A * 4/1971 Davis, II ............... E21B 43/283
                                                        299/5
3,724,898 A * 4/1973 Jacoby .................. E21B 43/281
                                                        299/5
(Continued)

FOREIGN PATENT DOCUMENTS

CA       2844919 A1    2/2012
CN     108562617 B    10/2020
(Continued)

OTHER PUBLICATIONS

First Examination Report issued in Saudi Arabia Application No. 123441432, dated Dec. 28, 2023 (7 pages).
(Continued)

*Primary Examiner* — Carib A Oquendo
(74) *Attorney, Agent, or Firm* — Osha Bergman Watanabe & Burton LLP

(57) ABSTRACT

The present disclosure is directed toward a system and a method for storing gas. The system for storing gas comprises a salt formation, an overburden, an underburden, a salt cavern within the salt formation, a sorbent within the salt cavern, and a well traversing the surface that connects the surface with the salt cavern. The method for storing gas comprises several steps. A dissolving fluid comprising water is injected into a salt formation to produce a brine and a salt cavern within the salt formation. The brine is then removed from the salt cavern. A sorbent is then placed within the salt cavern before gas is injected into the salt cavern.

15 Claims, 2 Drawing Sheets

(51) Int. Cl.
E21B 41/00 (2006.01)
E21B 43/28 (2006.01)
F17C 1/00 (2006.01)
F17C 11/00 (2006.01)
(52) U.S. Cl.
CPC .............. *E21B 43/28* (2013.01); *F17C 1/007* (2013.01); *F17C 11/007* (2013.01); *F17C 2221/033* (2013.01); *F17C 2223/035* (2013.01); *F17C 2223/036* (2013.01); *F17C 2270/0155* (2013.01)
(58) Field of Classification Search
CPC ................ F17C 1/007; F17C 2221/033; F17C 2223/035; F17C 2223/036; F17C 2270/0155
See application file for complete search history.

(56) References Cited

U.S. PATENT DOCUMENTS

| | | | | |
|---|---|---|---|---|
| 3,807,181 | A | * | 4/1974 | Kuhne .................. F17C 11/007 405/59 |
| 4,949,749 | A | | 8/1990 | Fowler et al. |
| 5,957,539 | A | * | 9/1999 | Durup .................... E21B 43/28 299/4 |
| 9,718,618 | B2 | | 8/2017 | Oates |
| 10,816,494 | B2 | | 10/2020 | Cerepi et al. |
| 11,560,322 | B1 | | 1/2023 | Lu |
| 2009/0309408 | A1 | * | 12/2009 | Bishop ...................... F16L 9/19 299/5 |
| 2011/0033238 | A1 | * | 2/2011 | Riese .................. E21B 41/0064 405/53 |
| 2011/0175428 | A1 | * | 7/2011 | Haugen .................... E21B 43/28 299/4 |
| 2011/0305515 | A1 | | 12/2011 | Drnevich |
| 2014/0262739 | A1 | * | 9/2014 | Fong ........................ F24S 10/13 202/234 |
| 2016/0089705 | A1 | | 3/2016 | Oates |
| 2016/0361741 | A1 | | 12/2016 | Kondo et al. |

FOREIGN PATENT DOCUMENTS

| | | | |
|---|---|---|---|
| DE | 19857447 | A1 | 6/2000 |
| EP | 0506600 | A1 | 9/1992 |
| JP | 2010201330 | A | 9/2010 |
| JP | 20100201330 | * | 9/2010 |

OTHER PUBLICATIONS

H. A. Patel et al., "High capacity carbon dioxide adsorption by inexpensive covalent organic Polymers", J. Mater. Chem., 2012, 22, 8431. <https://doi.org/10.1039/C2JM30761H>. (7 pages).
H. A. Patel et al., "Highly Stable Nanoporous Sulfur-Bridged Covalent Organic Polymers for Carbon Dioxide Removal", Adv. Funct. Mater. 2013, 23, 2270-2276. <https://doi.org/10.1002/adfm.201202442>. (7 pages).
R. Ullah et al., "Investigation of Ester- and Amide-Linker-Based Porous Organic Polymers for Carbon Dioxide Capture and Separation at Wide Temperatures and Pressures", ACS Appl. Mater. Interfaces 2016, 8, 20772?20785. <https://doi.org/10.1021/acsami.6b05927>. (61 pages).
E. Deniz et al., "A combined computational and experimental study of high pressure and supercritical CO2 adsorption on Basolite MOFs", Microporous and Mesoporous Materials 175 (2013) 34-42. <http://dx.doi.org/10.1016/j.micromeso.2013.03.015>.(9 pages).
H. A. Patel et al., "Carbon Dioxide Capture Adsorbents: Chemistry and Methods", ChemSusChem, 2016, <https://doi.org/10.1002/cssc.201601545>. (16 pages).
D. G. Caglayan et al., "Technical potential of salt caverns for hydrogen storage in Europ", International Journal of Hydrogen Energy, 2020, vol. 45, No. 11, pp. 6793-6805. (22 pages).
R. Habibi, "An investigation into design concepts, design methods and stability criteria of salt caverns", Oil & Gas Science and Technology-Revue d'IFP Energies nouvelles, 2019, vol. 74, No. 14, pp. 1-17 (17 pages).
Islamoglu et al., "Benchmark Study of Hydrogen Storage in Metal-Organic Frameworks under Temperature and Pressure Swing Conditions", ACS Energy Letters, 2018, vol. 3, pp. 748-754. (7 pages).
M. T. Kapelewski et al., "Record High Hydrogen Storage Capacity in the Metal?Organic Framework Ni2(m-dobdc) at Near-Ambient Temperatures", Chem. Mater., 2018, vol. 30, No. 22, pp. 8179-8189 (26 pages).
M. P. Laban, "Hydrogen Storage in Salt Caverns: Chemical modelling and analysis of large-scale hydrogen storage in underground salt caverns", TU Delfft, 2020 (100 pages).
D. Marco-Lozar et al., "Activated carbon monoliths for methane storage: influence of binder", Carbon, 2002, vol. 40, pp. 2817-2825 (9 pages).
M. Mohan et al., 2018. "Hydrogen storage in carbon materials—A review", Energy Storage, 2018, e35. pp. 1-26 (26 pages).
V. K. Singh, "Geological Storage: Underground Gas Storage", 8th Biennial International Conference & Exposition on Petroleum Geophysics, 2010 (7 pages).
R. Tarkowski, et al., "Salt domes in Poland-potential sites for hydrogen storage in caverns", International Journal of Hydrogen Energy, 2018, vol. 43, No. 46, pp. 21414-21427 (14 pages).
J. K. Warren, "Evaporites: sediments, resources and hydrocarbons", Springer Science & Business Media, 2006 (30 pages).
J. K. Warren, "Salt usually seals, but sometimes leaks: Implications for mine and cavern stabilities in the short and long term", Earth-Science Reviews, 2017, vol. 165, pp. 302-341 (40 pages).
D. Zivar et al., "Underground hydrogen storage: A comprehensive review", International Journal of Hydrogen Energy, 2021, vol. 46, pp. 23436-23462 (27 pages).
M. J. Prosniewski et al., "Controlled charge and discharge of a 40-L monolithic adsorbed natural gas tank", Adsorption, 2018, vol. 24, pp. 541-550 <https://doi.org/10.1007/s10450-018-9961-2>. (10 pages).
J. P. Marco-Lozar et al., "Gas Storage Scale-up at Room Temperature on High Density Carbon Materials", Carbon 76, 2014, pp. 123-132, <http://dx.doi.org/10.1016/j.carbon.2014.04.058>. (27 pages).
V. Rozyyev et al., "High-capacity methane storage in flexible alkane-linked porous aromatic network polymers", Nature Energy, 2019, vol. 4, 604, <https://doi.org/10.1038/s41560-019-0427-x> (8 pages).
J. A. Mason et al., "Methane storage in flexible metal-organic frameworks with intrinsic thermal management", Nature, 2015, vol. 527, pp. 357-361, <https://doi.org/10.1038/nature15732> (15 pages).
S. P. Tedds, "Microporous Materials for Hydrogen Storage"; A thesis, Dec. 2010 (337 pages).
L. S. Blankenship II, et al. "Oxygen-rich microporous carbons with exceptional hydrogen storage capacity"; Nature Communications, Oct. 29, 2021 (12 pages).
J. Andersson, et al. "Large-scale Storage of Hydrogen"; International Journal of Hydrogen Energy, 2019, vol. 44, pp. 11901-11919 (20 pages).
P. Ramirez-Vidal, et al. "A Step Forward in Understanding the Hydrogen Absorption and Compression on Activated Carbons", ACS Applied Materials & Interfaces, 2021, vol. 13, pp. 12562-12574 (13 pages).
E. Rozzi, et al. "Dynamic modeling and thermal management of a Power-to-Power system with hydrogen storage in microporous absorbent materials", Journal of Energy Storage, 2021, vol. 41, 102953 (15 pages).
G. Sdanghi, et al. "Towards Non-Mechanical Hybrid Hyrdogen Compression for Decentralized Hydrogen Facilities", Energies, Jun. 17, 2020 (28 pages).
M. Bai et al.; "Multiporosity/Multipermeability Approach to the Simulation of Naturally Fractured Reservoirs", Water Resources Research; vol. 29; No. 6; Jun. 1993; pp. 1621-1633 (13 pages).
Chao Liu; "Fundamental solutions to the transversely isotropic poroeslastodynamics Mandel's problem", International Journal for Numerical and Analytical Methods in Geomechanics; vol. 45; Issue 13; Jul. 24, 2021 (24 pages).

(56) References Cited

OTHER PUBLICATIONS

C. Liu et al., "Poroelastodynamic responses of a dual-porosity dual-permeability material under harmonic loading", Partial Differential Equations in Applied Mathematics; vol. 4; Dec. 2021 (6 pages).
Chao Liu; "Dual-Porosity Dual-Permeability Poroelastodynamics Analytical Solutions for Mandel's Problems", Journal of Applied Mechanics; vol. 88; Jan. 2021; pp. 1-10 (10 pages).
A. Mehrabian et al., "Mandel's problem reloaded", Journal of Sound and Vibration; vol. 492; Feb. 3, 2021 (16 pages).
S. R. Pride et al., "Linear dynamics of double-porosity dual-permeability materials. I. Governing equations and acoustic attenuation", Physical Reviw E; vol. 68; No. 036603; Sep. 2003 (10 pages).
W. Yan et al.; "A robust NMR method to measure porosity of low porosity rocks", Microporous and Mesoporous Materials; vol. 269; Oct. 2018 (5 pages).
Office Action issued by the Saudi Arabian Patent Office for corresponding Saudi Arabian patent application No. 123446812, mailed Mar. 23, 2025 (9 pages).
Non-Final Office Action issued by the U.S. patent office for corresponding U.S. Appl. No. 18/185,733, mailed Nov. 27, 2024 (6 pages).

\* cited by examiner

METHOD TO ENHANCE SUBSURFACE GAS STORAGE IN SALT CAVERNS

BACKGROUND

Large amounts of gas are utilized in various applications, such as use in the chemical industry, as a fuel for transport, as well as a means for energy storage. In order to be used in these applications, gases must be stored through various means. Storage of hydrogen underground may be useful in the storage of energy for stabilizing power grid output in the operation of intermittent energy sources, such as solar or wind power, as well as providing fuel for electricity generation and for transportation.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a system and a method for storing gases. The system for storing gas comprises a salt formation, an overburden, an underburden, a salt cavern within the salt formation, a sorbent within the salt cavern, and a well traversing the surface that connects the surface with the salt cavern. The overburden is proximal to the surface and adjacent to the salt formation, whereas the underburden is also adjacent to the salt formation but is distal to the overburden.

The method for storing gas comprises several steps. A dissolving fluid comprising water is injected into a salt formation to produce a brine and a salt cavern within the salt formation. The brine is then removed from the salt cavern. A sorbent is then emplaced within the salt cavern before gas is injected into the salt cavern.

Other aspects and advantages of the claimed subject matter will be apparent from the following description and the appended claims.

DETAILED DESCRIPTION

Figure 1:
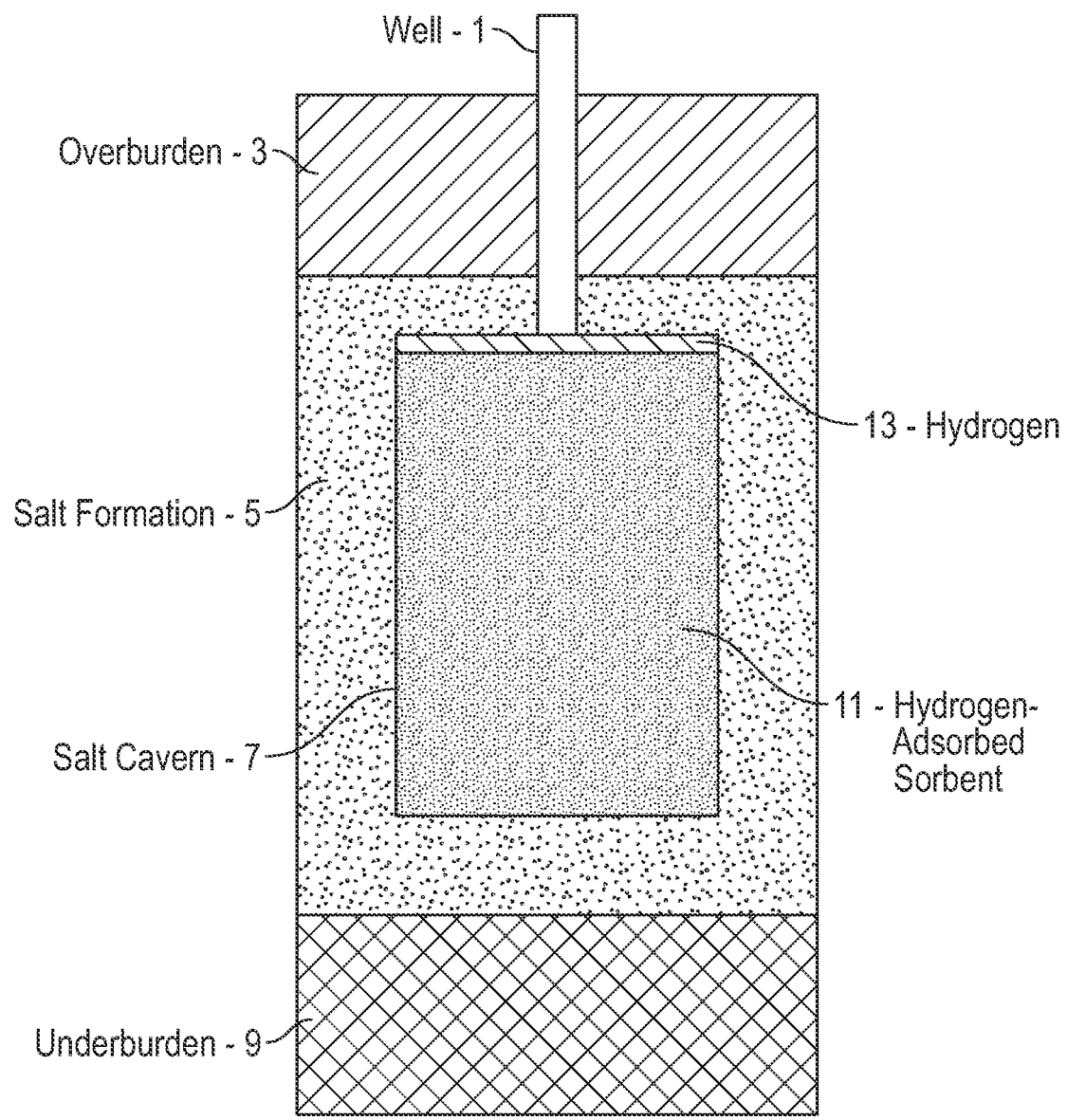
FIG. 1 is an embodiment of a hydrogen storage system.

Hydrogen has uses in applications that may range from the chemical industry, transportation fuel, and a means for storing energy. Hydrogen needs to be stored in order to use it in one or more applications, such as using it as an energy source or as an energy storage medium. Methane may be stored for reasons similar to those for hydrogen. For instance, it may be stored for use in the chemical industry, fuel, for storing energy, or other reasons. Carbon dioxide may be stored for the purposes of long-term sequestration or other uses. However, storing these gases typically requires a large volume. For example, hydrogen is a low-density material; 1 kg of hydrogen gas occupies over 11 $m^3$ at atmospheric pressure and room temperature. This means that a large amount of hydrogen necessarily requires a large volume to store under these conditions. This is true for methane, carbon dioxide, and other gases as well.

Gases, such as hydrogen, methane, and carbon dioxide may be stored, according to embodiments herein, in sorbent materials located underground within engineered salt caverns. During or following formation of an engineered salt cavern, sorbent materials may be placed in the engineered salt caverns. Gas, when disposed within the sorbent-filled engineered salt cavern, will adsorb onto the sorbent materials, allowing for efficient subterranean gas storage. This would enable energy storage to be carried out. In some embodiments, due to the solid nature of sorbent, formation pressure in a salt formation that is caused by weight of the overlying rock may be able to be resisted, at least in part, by the solid sorbent particles. This would reduce the needed amount of cushion gas, or the minimum pressure exerted by the gas, that fills a cavern to help maintain its shape, and thus increasing the volume of working gas, in this case gas, that may be withdrawn from the cavern. Here, "working gas" is defined as the volume of gas that may be stored and withdrawn. The phrase "cushion gas" is defined as the minimum amount of gas that must remain in the salt cavern to help maintain its shape and prevent collapse, the cushion gas providing a pressure force on the cavern walls.

In some embodiments, the role of "cushion gas" is filled by a minimum amount of gas that must remain in the salt cavern to help maintain its shape and prevent collapse. In some embodiments, a greater mass of gas may be stored than can be stored in an unfilled salt cavern alone, owing to the ability of some sorbents to store a greater mass of gas at pressure than an unfilled space and a reduced required amount of cushion gas. The maximum amount of working gas that may be stored in a salt cavern is bounded by the pressure from the rock above, the strength of the rock in the formation, and other properties. That is to say, the maximum total gas amount that may be stored in a salt cavern is defined by factors including the salt cavern's depth, the weight of the rock above the salt cavern, the strength and resistance to fracture of the surrounding rock, and other factors known to those skilled in the art, and, in embodiments herein, the added support provided to the cavern by the solid sorbents disposed within the cavern for use in storing the gas.

There are several types of sorbents that may be used. "Sorbent" here is defined as a material that supports physical storage of a gas that concentrates on the surface of the material. Typically, these materials have large surface areas. In some embodiments, this allows gas to adsorb onto the surface, enabling a gas to be stored under pressure in a smaller space than would otherwise be possible. The higher adsorption of gas of these materials originates from the adsorption of gases in the microporous networks of these materials. Sorbents that are porous with microscopic pores of less than 2 nm in diameter are known here as "microporous materials". Surface areas per gram of sorbents may vary from 100-7000 $m^2/g$ in some embodiments, from 500-5000 $m^2/g$ in other embodiments, and from 1000-3000 $m^2/g$ in other embodiments. Pore volume per gram of the sorbents may vary from 0.1-2.5 $cm^3/g$ in some embodiments, from 0.2-1.0 $cm^3/g$ in other embodiments, and from 0.35-0.50 $cm^3/g$ in other embodiments. Micropore volume per gram of the sorbent may vary from 0.05-1.5 $cm^3/g$ in some embodiments, from 0.1-0.75 $cm^3/g$ in other embodiments, and from 0.3-0.50 $cm^3/g$ in other embodiments. Sorbents may have a density that ranges from 0.1-2.5 $g/cm^3$ in some embodiments, from 0.4-1.5 $g/cm^3$ in other embodiments, and from 0.5-1.0 $g/cm^3$ in other embodiments.

In one or more embodiments, sorbents may have one or more shapes that include, but are not limited to, spherical, cubic, oval, cylindrical pellets, capsules, fibers, or mixture of these. In one or more embodiments, the sorbents may comprise materials that are organic, inorganic, organic-inorganic hybrids, or a mixture of these materials. In one or more embodiments, the sorbents may comprise materials that are amorphous, crystalline, polycrystalline or a mixture of these materials. In one or more embodiments, activated carbons may be used as sorbents. In one or more embodiments, sorbents may comprise metal-organic frameworks, amine-impregnated metal-organic frameworks. In one or more embodiments, sorbents may comprise aluminosilicates or zeolite-type materials. In one or more embodiments, sorbents may comprise porous silicates and porous silica. In one or more embodiments, sorbents may comprise porous polymers. In one or more embodiments, sorbents may comprise a combination of two or more of these porous materials or other sorbents as may be developed or known to those of skill in the art. In one or more embodiments, sorbents may comprise microporous materials. While sorbents that chemically bind with the gas molecule may be useful for trapping gas within the cavern, such as metal hydrides or chemical hydrides for storing hydrogen, sorbents that allow easy storage and recovery of hydrogen and other gases via pressure swing are more suitable for systems that may cycle between gas storage and gas consumption.

Sorbent particles may have a particle size that ranges from 5 to 1000 microns in some embodiments, from 10 to 500 microns in other embodiments, and from 50 to 100 microns in other embodiments.

Sorbent may be conglomerated into larger particles through the use of binders. These binders may be mixed with the sorbent to form larger conglomerations that may take the form of binder/sorbent particles, or particles comprised of binder and sorbent. Average size of the binder/sorbent particles may range from 1-20 mm in some embodiments, from 3-10 mm in other embodiments, and from 4-5 mm in other embodiments. The binder is characterized by its ability to form the sorbent into particles, and may comprise one or more of bentonite, polymer, natural polymer, or other material capable of forming conglomerations. These conglomerations may also include other materials known to those skilled in the art for their ability to form conglomerations, to stabilize conglomerations, or for other purposes.

Hydrogen, carbon dioxide, and methane molecules have small molecular sizes and may diffuse easily through some geological formations. Salt formations are rock layers, the plurality of which is comprised of a dissolvable salt material, such as sodium chloride or other halite-forming salts. Closer to the surface, above the salt formation, lies an overburden, which is the rock and/or soil that is adjacent to and rests on top of the salt formation. Below the salt formation is the underburden, which is the rock and soil that is adjacent to and lies directly below the salt formation. The underburden is distal to the overburden. The temperature of salt formations useful in embodiments herein may range from 5-50° C., for example, from 10-35° C. in other embodiments, and from 20-25° C. in other embodiments.

Salt caverns are man-made structures in salt formations. These salt formations have low permeability to the stored gas, such as, for example, $10^{-6}$ to $10^{-9}$ md, allowing for gas under pressure to remain in a cavern for long periods. Low permeability of salt formations facilitates the storage of gas within a salt cavern produced within them. In one or more embodiments, the permeability of the formation may be less than about $10^{-15}$ $m^2$. In one or more embodiments, the permeability of the formation may have a range with an upper limit of any one of $10^{-15}$ $m^2$, $10^{-18}$ $m^2$, or $10^{-21}$ $m^2$. In one or more embodiments, the permeability of the formation may range from about $10^{-15}$ $m^2$ to less than $10^{-21}$ $m^2$. This allows for storage of gas, as salt caverns are typically made to have volumes ranging from about 100,000 $m^3$ to about 5,000,000 $m^3$. Larger or smaller volumes are possible in some embodiments. Other embodiments may have volumes from about 200,000 $m^3$ to about 3,000,000 $m^3$. Still other embodiments may have volumes ranging from about 500,000 $m^3$ to about 1,000,000 $m^3$.

In some embodiments, the salt cavern may be formed having a shape such as cylindrical, ellipsoid, or capsule-shaped. In other embodiments, such as salt caverns in bedded salt formations, the cavern may have an irregular geometry. The salt cavern may have a diameter, or effective diameter, ranging from 5 m to 100 m in some embodiments, from 10 m to 50 m in other embodiments, or from 25 m to 40 m in other embodiments. The length of the salt cavern may range from 100 m to 2000 m in some embodiments, from 200 m to 1000 m in other embodiments, or from 300 m to 500 m in other embodiments. The sizes of salt caverns that can be produced may depend on the initial size of the salt formation, the amount of gas that is desired to be stored, along with the stability of the salt cavern, or its ability to remain structurally intact over long periods. This size, the strength of the walls of the cavern, and its depth from the surface are some parameters that need to be considered in the design of salt caverns and multiple salt cavern systems.

In some embodiments, a salt cavern may be created by drilling a well into a salt formation and injecting a dissolving fluid into the salt formation that facilitates dissolution of the salt. This dissolving fluid is typically water but may comprise other compounds or materials. A cavern that is formed by this process is filled with brine (dissolving fluid comprising dissolved salts). The brine is subsequently removed, leaving behind a salt cavern of a particular size or dimension. Insoluble material in the salt formation may fall to or accumulate at the bottom of the cavern.

Injection of the dissolving fluid and removal of the brine may be performed using a single pipe or multiple pipes. For example, multiple pipes may be disposed through the same well in some embodiments, with a smaller diameter pipe inside of a larger diameter pipe, leaving an open annulus in the larger diameter pipe and an open channel in the smaller diameter pipe. In one or more embodiments, the smaller diameter pipe may be longer, with dissolving fluid being injected into the formation either via the shorter or longer pipe. The dissolving fluid may be injected via the larger pipe, through the annulus, and withdrawn through the inner pipe, in some embodiments. In other embodiments, the dissolving fluid may be injected via the inner pipe and withdrawn through the annulus. The annular pipe may terminate, for example, proximate a roof of the cavern, while the inner pipe may be extended during cavern formation to be proximate a bottom of the cavern throughout the cavern-forming process. The circulation pattern and injection method, among other variables, may influence cavern shape and size.

Dissolving fluid may be injected into the formation multiple times to produce a salt cavern of desired dimensions. Compressed gas, such as air, may be used to remove the dissolving fluid, to remove contaminants, and to prevent collapse of the salt cavern during formation (the compressed gas providing a cushion gas during cavern formation). Typical depths of the roof of the salt cavern from the surface may range from 100 m to 5000 m in some embodiments, from 500 m to 2500 m in other embodiments, and from 1000 m to 1500 m in other embodiments. In some embodiments, salt caverns of other dimensions or those produced through other methods may be possible as well. In one or more embodiments, a field of multiple salt caverns in a salt formation may be employed. In one or more embodiments, more than one well may be drilled for a single salt cavern, particularly in the case of salt formations that are more than 500 m thick or in other situations apparent to those skilled in the art. The number of wells may be governed, for example, by the size and shape of the salt layers.

After a salt cavern is produced, sorbents suitable for adsorbing the gas to be stored are then placed in the cavern. In some embodiments, the sorbent may be placed by a carrying fluid, characterized by its ability to carry the sorbent into the salt cavern. The carrying fluid may be a liquid, a gas, or other material suitable for carrying the sorbent. In at least one embodiment, the carrying fluid is a liquid, and the sorbent is carried into the salt cavern as a dispersion or slurry in the liquid. In one or more embodiments, placing the sorbents in the salt cavern is done in several steps, where the sorbent in the carrying fluid is pumped into the salt cavern, the sorbents are allowed to settle gravitationally, and the excess carrying fluid is then removed from the salt cavern through compressed air pressurization. The compressed gas may also be used as a cushion gas during sorbent injection to prevent wall collapse. Injection of sorbent with concurrent removal of liquids or other carrier fluids is also envisioned.

In one or more embodiments vacuum or pressure is employed to facilitate removal of the carrying fluid once the salt cavern has been filled with sorbents, leaving behind a salt cavern filled with dry sorbent. In one or more embodiments, the salt cavern may be filled with a quantity of sorbent between about 50 metric tons and about 2 million metric tons. In other embodiments, the salt cavern may be filled with a quantity of sorbent between about 500 metric tons and about 1 million metric tons. In still other embodiments, the salt cavern may be filled with a quantity of sorbent between 1000 metric tons and 0.5 million metric tons.

In some embodiments, for example, following cavern formation, the outer pipe may be proximate a cavern roof, and the inner pipe may be proximate a floor of the cavern. A slurry of sorbents may be injected via the annulus, and the liquids may be withdrawn through the inner pipe. To prevent undesired entrainment of sorbent with the removed liquids, a filter or other device restricting influx of sorbent to the inner pipe may be used in some embodiments. In other embodiments, filtration may not be used. In one or more embodiments, the sorbent may be in the form of pellets or monoliths held together using binders, rather than in a fine powdered form and filtration may not be part of the operation. In these cases, the density and size of the sorbents/binder particles is great enough that the particles may settle in the cavern based on their densities, allowing separation of particles from carrying fluid via sedimentation.

As noted above, sorbent may be disposed into the cavern and allowed to settle via gravity. Natural settling of the sorbents, however, may result in an inefficient filling of the cavern with sorbent, especially for sorbents that do not easily flow. Free-flowing sorbents may fill the cavern more readily, but even free-flowing sorbents may have difficulty in completely filling the top of the cavern. Agitation or dispersion devices may be used to ensure that the cavern is properly filled and/or to promote settling of the sorbents. In one or more embodiments, downhole tools may be used through the drill pipe to place the sorbent and fluid into the cavern. For example, among other tools that may be used, various tools that may provide for control of the direction of flow into the cavern may be used to facilitate distribution. The salt cavern may be filled step-by-step to improve filling characteristics.

As one skilled in the art could readily envisage, filling a cavern with a sorbent may result in an uneven distribution of the sorbent within the cavern. Efficient distribution and settling (packing) of the sorbent within the volume of the cavern may provide for the maximum support being provided by the sorbent to the walls of the cavern, thus maximizing the working volume (minimizing the needed cushion gas volume or pressure) and minimizing the possibility for collapse or other damage to the cavern.

In some embodiments, placement of the sorbent according to embodiments herein may result in the sorbent occupying at least 90 vol % of the cavern (total volume of solids, including void space between particles), at least 95 vol % of the cavern in other embodiments, and at least 98 vol % or at least 99 vol % of the cavern in other embodiments. In yet other embodiments, 100 vol % of the cavern may be occupied by sorbent, and in yet other embodiments, the cavern may be over-filled with sorbent such that a portion of the well, below any valving or other sealing device attached to the well, also includes a volume of sorbent. The over-filling of the cavern may ensure each of the walls (floor, sides, and ceiling) are supported by sorbent, as well as providing some volume of sorbent to account for any additional settling of the sorbent that may occur due to pressurization and depressurization during normal use of the cavern. In one or more embodiments, it is preferred to fill the salt cavern as much as possible because the sorbent provides cavern stability in addition to enhanced storage capacity. Minimizing the head space unfilled with sorbent will provide maximum wall support and a maximum working volume. Accordingly, embodiments herein may provide for contact of a portion of the sorbent with each wall of the cavern (bottom, sides, and top), thereby providing support to each wall of the cavern.

Gas is then inserted into the sorbent-filled salt cavern. The maximum amount of compressed gas that may be inserted into the sorbent-filled salt cavern is determined by the gas storage capacity of the sorbent, based on the pressure and temperature conditions of the salt cavern. Once the desired amount of gas is inserted in the sorbent-filled salt cavern, the well head of the sorbent-filled salt cavern is sealed. Releasing pressure at the surface can allow for the desorption of gas from the sorbent and the removal of gas from the sorbent-filled salt cavern. Gas may then be stored and released, as desired, to provide gas to the various end uses as noted above.

FIG. 1 is an illustration of a hydrogen storage system according to embodiments herein. In FIG. 1, a well 1 traverses an overburden 3 and enters a salt formation 5, forming a pathway to a salt cavern 7. Underneath the salt formation 5 is an underburden 9. Inside of the salt cavern 7 is a hydrogen-adsorbed sorbent 11, and hydrogen gas 13 is stored in the cavern, both absorbed onto the sorbent and in the free space within the cavern. The well head is sealed, such as by a valve or other appropriate device, to prevent escape of the hydrogen when not being extracted.

Figure 2:
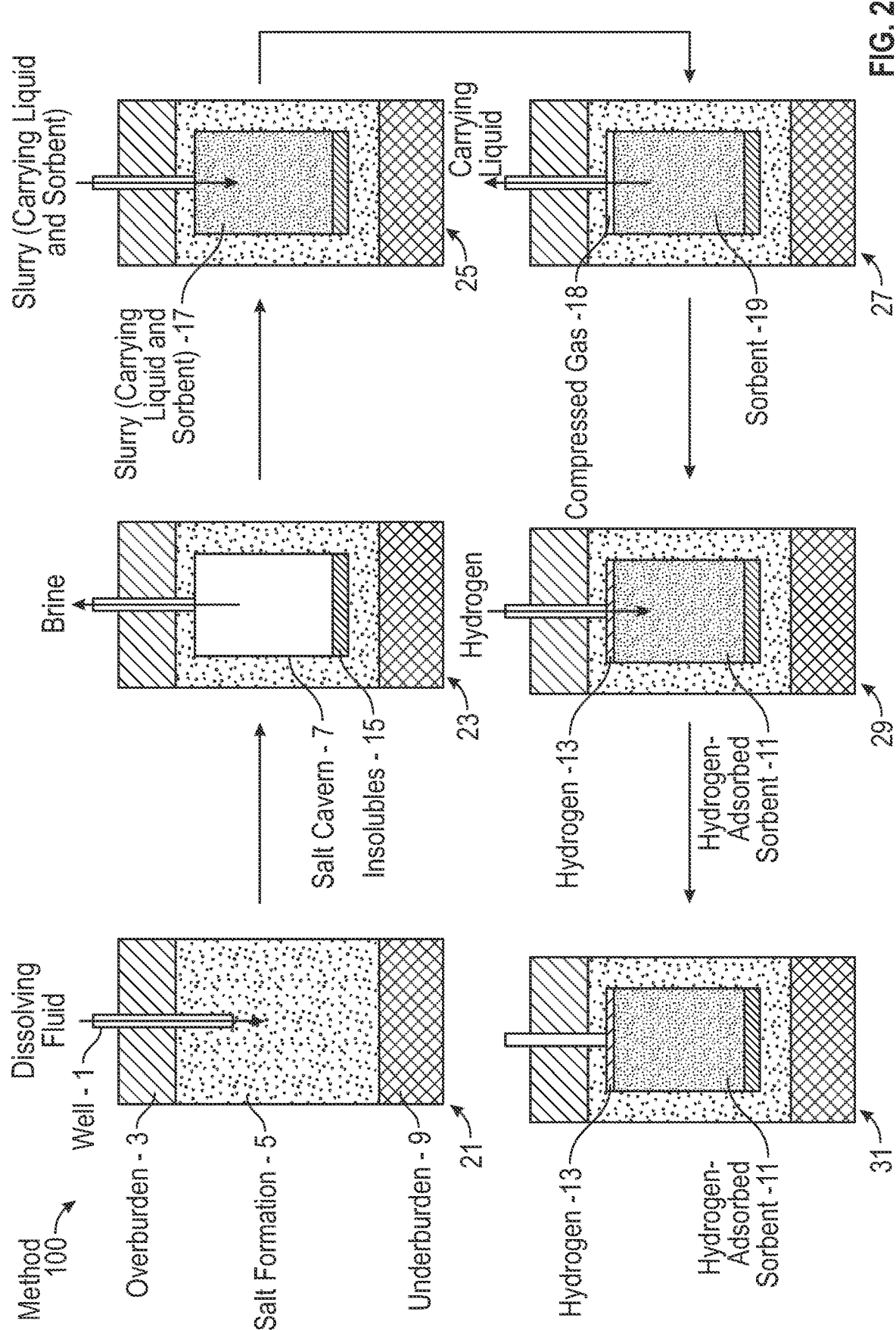
FIG. 2 is an embodiment of a method 100 for effecting hydrogen storage.

FIG. 2 illustrates a method 100 for effecting hydrogen storage according to embodiments herein. Method 100 is representative of some embodiments of a method for producing a sorbent-filled salt cavern and storing hydrogen. In method 100, a well 1 is drilled through an overburden 3 into a salt formation 5, traversing the overburden 3 and entering the salt formation 5. The salt formation lies atop an underburden 9. In step 21 of method 100, a dissolving fluid, such as water or other solvents with sufficient salt dissolution capability and carrying capacity, is injected into the salt formation 5 through the well 1. The dissolving fluid dissolves part of the salt formation 5. In this step, step 21, a salt cavern is created by the process of solution mining, where a feed solvent is injected into a wellbore drilled into a subsurface salt formation. The brine thus generated by dissolving (leaching) the formation salt is then extracted to create the cavity in the subsurface. The process of dissolution and brine extraction are repeated over multiple cycles until a cavern of desired dimensions in created in the subsurface.

The generally preferred shape for salt caverns is a generally cylindrical cavity several hundred meters high and 50-80 meters (m) in diameter. Depending upon the formation being dissolved and the desired shape of the cavern, direct (inject solvent at bottom of cavern, withdraw brine from top) or reverse (inject solvent at top, withdraw brine from bottom of cavern) brine circulation may be used to create the cavern. While the circulating solvent/brine may provide some weight (pressure) to support the cavern walls, a cushion gas, such as compressed air or compressed nitrogen, may be provided during the cavern formation process to ensure that the cavern is fully supported as it is being created.

The brine is then removed (step 23), leaving behind insolubles 15 and a salt cavern 7. The dehydration of the salt cavern can be carried out to remove water or brine from the caverns. The compressed air can be used for removing contaminates from the salt caverns and the cavern may be pressured with compressed air during the dehydration step to restrict the salt caverns from collapsing due to formation pressure.

Following formation of the salt cavern 7, step 25 may include disposing a sorbent—carrier fluid mixture 17 within the cavern. In some embodiments, a slurry, comprising a carrying liquid and a sorbent, is injected into the salt cavern 7. The slurry of sorbent 17 (dispersed in liquid—aqueous or nonaqueous) is pumped into the salt cavern 7 in several steps. During each step, the sorbent 17 will be allowed to settle down gravitationally and the excess liquid is evacuated using compressed air. In other embodiments, the solid sorbents may be flowed into the salt cavern 7 without the aid of a liquid, or transport of the solid sorbents may be facilitated using a carrier gas, such as air or nitrogen.

Once the salt cavern 7 is filled with the sorbent-carrier fluid mixture 17, the liquid can be removed, step 27, through vacuum or pressure. In this embodiment, compressed gas 18 is injected, causing the carrying liquid to be removed 27, leaving behind a salt cavern filled with sorbent 19 and compressed gas 18. The pressure of the compressed gas may, for example, push the liquids out of a pipe extending to a floor of the cavern; a "dry" gas may also be used to remove liquids, such as water or other carrier fluids, from the sorbent. A dry gas is a low humidity gas that is capable of the uptake of water or moisture.

Hydrogen gas 13 is then pumped, step 29, into the salt cavern 7 filled with sorbent 17. Hydrogen gas 13 is compressed in the sorbent-filled salt cavern according to the theoretical capacity of the sorbents 17 based on the pressure and temperature condition of the salt cavern. Hydrogen gas 13 adsorbs onto the sorbents 17, producing hydrogen-adsorbed sorbent 11. On reaching the maximum hydrogen storage capacity, the well head of the salt caverns is closed 31 for long-term hydrogen storage. In one or more embodiments, this may be done via closing a valve on the surface. The hydrogen gas 13 from the hydrogen-adsorbed sorbent 11 can be released according to requirement from the surface through pressure release valves.

Method 100 is only one embodiment. Other embodiments of the present invention may be possible, using differing configurations, materials, and method steps readily envisioned by those skilled in the art based on the present description, including for caverns useful for storage of other gases, such as carbon dioxide or methane.

Example 1

In Example 1, theoretical storage capacity of several different types of sorbent (mass gas per unit volume) are shown at differing pressures at 25° C. Hydrogen storage capacity without sorbent (open volume) is calculated using the ideal gas law. The sorbents utilized here are: Sorbent 1, carbon monolith (density: 1.07 g/cm$^3$, surface area: 1050 m$^2$/g, supplied by ATMI/Entegris Inc.); Sorbent 2, Activated carbon (density: 0.36 g/cm$^3$, surface area: 3000 m$^2$/g, Maxsorb3000 supplied by Kansai Coke & Chemical Co.); and Sorbent 3, Ni(dobdc) metal organic frameworks (density: 0.366 g/cm$^3$, surface area 1029 m$^2$/g, based on Kapelewski et al., Chem. Mater. 2018, 30, 8179-8189). Storage data at differing pressures of Sorbent 1 and Sorbent 2 were obtained from Marco-Lozar et al. (Carbon, 76, 123, 2014). Storage capacity with sorbent is calculated based on the amount of H$_2$ adsorbed on the basis of the mass of adsorbent that is needed to fill the volume of the empty cavern. Theoretical storage capacities are shown below in Table 1.

TABLE 1

Performance of hydrogen storage in confined space filled with sorbents.

| | Volumetric (Kg H$_2$/L) | | |
|---|---|---|---|
| | 725 psi | 1450 psi | 2900 psi |
| Compressed H$_2$ (empty cavern) | 0.004 | 0.0075 | 0.014 |
| Compressed H$_2$ (cavern filled with Sorbent 1) | 0.006 | 0.011 | 0.0175 |
| Compressed H$_2$ (cavern filled with Sorbent 2) | 0.005 | 0.009 | 0.0155 |
| Compressed H$_2$ (cavern filled with Sorbent 3) | 0.007 | 0.0112 | 0.0176* |

Calculations for compressed hydrogen in a cavern filled with Sorbent 3 are extrapolated.

All three sorbents allowed for a greater theoretical mass of hydrogen stored per given volume of cavern when compared to an empty cavern alone, with Sorbent 3 allowing for the greatest hydrogen storage capacity out of the three sorbents.

Example 2

In Example 2, theoretical storage capacities of several embodiments of sorbents in a representative salt cavern were calculated at three different pressures at 25° C. The representative salt cavern has a diameter of 60 m and a height of 354 m, for a total volume of 1,000,911 m$^3$. These results are compared with compressed hydrogen gas in the representative salt cavern alone. Calculations of the quantity of hydrogen gas that may be stored in an empty cavern are carried out using the ideal gas law. In an empty cavern, the mass of hydrogen that may be stored is constrained on the low end by the pressure of the gas that will prevent collapse of the salt formation and on the high end by a pressure that is not so high as to hydraulically fracture the cavern walls or break non-salt intervals; sorbent filled caverns, however, may have a lower pressure requirement due to the support provided by the solid sorbent materials. Results are provided in Table 2.

TABLE 2

Performance of hydrogen storage in representative salt cavern

|  | Metric Tons $H_2$ | | |
| --- | --- | --- | --- |
|  | 725 psi | 1450 psi | 2900 psi |
| Compressed $H_2$ (empty salt cavern) | 4,003 | 30,027 | 420,382 |
| Compressed $H_2$ (salt cavern filled with Sorbent 1) | 6,005 | 44,040 | 525,478 |
| Compressed $H_2$ (salt cavern filled with Sorbent 2) | 5,004 | 36,032 | 465,423 |
| Compressed $H_2$ (salt cavern filled with Sorbent 3) | 7,006 | 44,840 | — |

Results were not calculated for Sorbent 3 at 2900 psi. In the presence of Sorbent 1, there is a 25-50% increase in theoretical hydrogen storage capacity over an empty cavern. In the presence of Sorbent 2, there is a 10-25% increase in theoretical hydrogen storage capacity over an empty cavern. In the presence of Sorbent 3, there is a 49-75% increase in theoretical hydrogen storage capacity over an empty cavern.

As described above, embodiments herein provide for forming a salt cavern, disposing a sorbent within the salt cavern, and storing gas in the sorbent-filled salt cavern. Use of a sorbent within the cavern advantageously provides a larger working gas volume (minimum amount of gas pressure required to prevent wall collapse) than for a cavern alone. Embodiments herein thus provide a method and system for the efficient storage of large volumes of gas, which may be repeatedly withdrawn and replenished, for use in various energy conversion or chemical conversion processes.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A system for subterranean gas storage comprising:
a well traversing a surface, an overburden, and a salt formation, the well connecting the surface with a salt cavern located within the salt formation,
wherein the overburden is proximal to the surface and adjacent to the salt formation,
wherein the salt formation is adjacent to an underburden that is distal to the overburden, and
wherein a microporous sorbent is disposed within the salt cavern.

2. The system of claim 1, wherein the sorbent comprises at least one microporous material selected from the group consisting of: activated carbons, metal organic frameworks, porous polymers, aluminosilicates, zeolites, porous silicates, and porous silica.

3. The system of claim 2, wherein the sorbent comprises the at least one microporous material and a binder.

4. The system of claim 1, wherein a surface area of the sorbent is between about 1000 m$^2$/g and about 3000 m$^2$/g.

5. The system of claim 1, wherein a pore volume of the sorbent is between about 0.35 cm$^3$/g and about 0.50 cm$^3$/g.

6. The system of claim 1, wherein a volume of the salt cavern is between about 500,000 m$^3$ and about 1,000,000 m$^3$.

7. The system of claim 1, wherein a quantity of the sorbent in the salt cavern is between about 1000 metric tons and about 0.5 million metric tons.

8. The system of claim 1, further comprising a gas injection and withdrawal system attached to the well and configured to dispose gas within the salt cavern or withdraw gas from the salt cavern.

9. The system of claim 1, wherein the microporous sorbent is disposed within the salt cavern and at least a portion of the well.

10. A method for storing gas comprising:
injecting a dissolving fluid comprising water into a salt formation, producing a salt cavern within the salt formation and a brine;
removing the brine from the salt cavern;
placing a microporous sorbent within the salt cavern; and
inserting gas into the salt cavern.

11. The method of claim 10, wherein placing the sorbent within the salt cavern comprises injecting into the salt cavern a slurry comprising a carrying liquid and the sorbent.

12. The method of claim 11, wherein the placing further comprises allowing the sorbent to settle within the salt cavern, removing at least a portion of the carrying liquid from the salt cavern, and injecting an additional volume of the slurry into the salt cavern.

13. The method of claim 12, wherein the injecting, allowing to settle, and the removing are repeated until at least 95 vol % of the salt cavern is filled with the sorbent.

14. The method of claim 10, wherein placing the sorbent within the salt cavern comprises transporting the sorbent into the salt cavern using a compressed gas.

15. The method of claim 10, wherein placing the sorbent within the salt cavern comprises at least one of distributing the sorbent within the salt cavern and agitating the sorbent within the salt cavern to facilitate settling of the sorbent.

* * * * *